US012732282B2

(12) United States Patent
Sato et al.

(10) Patent No.: US 12,732,282 B2
(45) Date of Patent: Sep. 8, 2026

(54) DIGITAL SIGNAL PROCESSING CIRCUIT, METHOD, RECEIVER, AND COMMUNICATION SYSTEM

(71) Applicant: NEC Corporation, Tokyo (JP)

(72) Inventors: Masaki Sato, Tokyo (JP); Manabu Arikawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 323 days.

(21) Appl. No.: 18/697,049

(22) PCT Filed: Oct. 18, 2021

(86) PCT No.: PCT/JP2021/038336

§ 371 (c)(1), (2) Date: Mar. 29, 2024

(87) PCT Pub. No.: WO2023/067641

PCT Pub. Date: Apr. 27, 2023

(65) Prior Publication Data

US 2025/0038858 A1 Jan. 30, 2025

(51) Int. Cl.
*H04B 10/61* (2013.01)
*H04J 14/06* (2006.01)

(52) U.S. Cl.
CPC ....... *H04B 10/6162* (2013.01); *H04B 10/614* (2013.01); *H04J 14/06* (2013.01)

(58) Field of Classification Search
None
See application file for complete search history.

(56) References Cited

U.S. PATENT DOCUMENTS

| | | | | |
|---|---|---|---|---|
| 10,708,035 | B2 * | 7/2020 | Oyama | H04B 10/616 |
| 11,728,900 | B2 * | 8/2023 | Arikawa | H04B 10/616 398/158 |
| 2022/0149974 | A1 * | 5/2022 | Kobayashi | H04B 10/6161 |

FOREIGN PATENT DOCUMENTS

| | | |
|---|---|---|
| JP | 2018-037735 A | 3/2018 |
| JP | 2022-174467 A | 11/2022 |

OTHER PUBLICATIONS

Da Silva et al., Widely Linear Equalization for IQ Imbalance and Skew Compensation in Optical Coherent Receivers, 2016 (Year: 2016).*
International Search Report for PCT Application No. PCT/JP2021/038336, mailed on Jan. 11, 2022.

(Continued)

*Primary Examiner* — Jai M Lee
(74) *Attorney, Agent, or Firm* — Sughrue Mion, PLLC

(57) ABSTRACT

A detector is configured to coherently receive a polarization-multiplexed optical signal transmitted from a transmitter via a transmission line. A digital signal processing circuit is configured to perform equalization signal processing on the reception signal coherently received. A carrier phase compensation filter is configured to compensate for a carrier phase in the reception signal. A 4×2 WL filter is disposed after the carrier phase compensation filter and configured to compensate for distortion included in the polarization-multiplexed optical signal. A filter coefficient updating unit is configured to update a filter coefficient of the carrier phase compensation filter and a filter coefficient of the 4×2 WL filter by use of an output of the 4×2 WL filter.

15 Claims, 9 Drawing Sheets

(56) References Cited

OTHER PUBLICATIONS

Chris R. S. Fludger and Theo Kupfer, "Transmitter impairment mitigation and monitoring for high baud-rate, high order modulation systems", ECOC 2016; 42nd European Conference and Exhibition on Optical Communication, Sep. 18-22, 2016, pp. 1-3.
Manabu Arikawa, and Kazunori Hayashi, "Transmitter and receiver impairment monitoring using adaptive multi-layer linear and widely linear filter coefficients controlled by stochastic gradient descent", Optics Express vol. 29, Issue 8, Apr. 12, 2021, pp. 1-14.
Silva E. P. et al., "Widely Linear Equalization for IQ Imbalance and Skew Compensation in Optical Coherent Receivers", Journal of Lightwave Technology, vol. 34, No. 15, Aug. 1, 2016, pp. 3577-3586.

* cited by examiner

DIGITAL SIGNAL PROCESSING CIRCUIT, METHOD, RECEIVER, AND COMMUNICATION SYSTEM

This application is a National Stage Entry of PCT/JP2021/038336 filed on Oct. 18, 2021, the contents of all of which are incorporated herein by reference, in their entirety.

TECHNICAL FIELD

The present disclosure relates to digital signal processing circuits, methods, receivers, and communication systems.

BACKGROUND ART

Multilevel modulation, such as high-order quadrature amplitude modulation (QAM), is being employed to achieve high spectrum utilization efficiency in optical fiber communication. The introduction of coherent reception technology has enabled flexible equalization signal processing on the receiver side through digital signal processing involving, for example, collectively compensating for, on the receiver side, the chromatic dispersion that accumulates in the optical fiber transmission line. However, high-order multilevel modulated signals are generally susceptible to distortion. Therefore, distortion resulting from, for example, the incompleteness of components within transmitter-receivers is to become a new bottleneck in advancing higher multileveling.

As related art, Non Patent Literature 1 discloses equalization digital signal processing on the receiver side. FIG. 14 shows equalization digital signal processing. The digital signal processing includes a filter used in a typical polarization-multiplexed coherent communication system. The filter includes an in-receiver distortion compensation filter 501, a chromatic dispersion compensation filter 502, a polarization separation filter 503 that performs polarization mode dispersion compensation and polarization separation, a carrier phase compensation filter 504, and an in-transmitter distortion compensation filter 505.

The filters above receive input of a sequence of a total of four real number reception signals of in-phase (I) components and quadrature (Q) components of local oscillator light of each of the two polarizations, the X- and Y-polarizations. The in-receiver distortion compensation filter 501, the chromatic dispersion compensation filter 502, the carrier phase compensation filter 504, and the in-transmitter distortion compensation filter 505 compensate for in-receiver distortion, chromatic dispersion, carrier phase, and in-transmitter distortion of each of the polarizations. Meanwhile, the polarization separation filter 503 handles the two polarizations.

Among the filters above, the in-receiver distortion compensation filter 501 and the chromatic dispersion compensation filter 502 are quasi-static filters. For the in-receiver distortion compensation filter 501 and the chromatic dispersion compensation filter 502, coefficients prepared based, for example, on a physical model on distortion are used. Meanwhile, the polarization separation filter 503 and the in-transmitter distortion compensation filter 505 are each a filter whose coefficient is controlled adaptively based on its own output. The coefficient of the carrier phase compensation filter 504 is calculated separately through, for example, a method that uses a pilot signal.

As another related art, Non Patent Literature 2 discloses correction and monitoring of transmitter/receiver impairment using a multilayer strictly linear (SL) filter and widely linear (WL) filter. According to Non Patent Literature 2, a 2×1 WL filter disposed for each polarization is used for an in-receiver distortion compensation filter and an in-transmitter distortion compensation filter. For a chromatic dispersion compensation filter and a carrier phase compensation filter, a 1×1 SL filter disposed for each polarization is used. For a polarization separation filter, a 2×2 SL filter is used. The coefficients of the in-receiver distortion compensation filter, the chromatic dispersion compensation filter, the polarization separation filter, the carrier phase compensation filter, and the in-transmitter distortion compensation filter are controlled adaptively with the use of an output of the in-transmitter distortion compensation filter, that is, the final-stage filter.

CITATION LIST

Non Patent Literature

Non Patent Literature 1: Chris R. S. Fludger and Theo Kupfer, "Transmitter impairment mitigation and monitoring for high baud-rate, high order modulation systems," ECOC 2016; 42nd European Conference on Optical Communication, 18-22 Sep. 2016.

Non Patent Literature 2: Manabu Arikawa and Kazunori Hayashi, "Transmitter and receiver impairment monitoring using adaptive multi-layer linear and widely linear filter coefficients controlled by stochastic gradient descent," Optics Express Vol. 29, Issue 8, pp. 11548-11561, 2021.

SUMMARY OF INVENTION

Technical Problem

To achieve an optical transmission system of 1 T bit per second (bps) or higher, a high symbol rate and a high multilevel modulation scheme are essential, and to ensure performance in such a high-level modulation scheme, high-accuracy equalization processing is necessary. According to Non Patent Literature 1, the effect produced on the transmitter side device (also referred to below as "Tx load") is compensated for on the receiver side. However, the performance of carrier phase compensation by the carrier phase compensation filter 504 disposed before the in-transmitter distortion compensation filter 505 is dependent on the Tx load. This poses a problem in that the performance of carrier phase compensation in the end affects the accuracy of equalization of the Tx load.

In the respect, according to Non Patent Literature 2, the coefficient of the filter at each stage is updated with the use of an output of the in-transmitter distortion compensation filter, the final-stage filter. Therefore, according to Patent Literature 2, the carrier phase in the carrier phase compensation filter can conceivably be compensated for independently of the Tx load. However, according to Patent Literature 2, the polarization separation filter is disposed before the carrier phase compensation. For the polarization separation filter and the transmitter distortion compensation filter, filters with a relatively large tap count are used, and this raises a problem of an increased circuit size for the equalization digital signal processing.

In view of the circumstances above, one object of the present disclosure is to provide a digital signal processing circuit, a method, a receiver, and a communication method capable of compensation of polarization mode dispersion and polarization separation as well as in-transmitter distortion compensation with a low tap count.

Solution to Problem

To achieve the object above, the present disclosure provides, as a first aspect, a digital signal processing circuit. The digital signal processing circuit includes: a first carrier phase compensation filter configured to compensate for a carrier phase in a polarization-multiplexed optical signal transmitted from a transmitter and received by a receiver: a 4×2 widely linear (WL) filter disposed after the first carrier phase compensation filter and configured to compensate for distortion included in the polarization-multiplexed optical signal; and a filter coefficient updating unit configured to update a filter coefficient of the first carrier phase compensation filter and a filter coefficient of the 4×2 WL filter with use of an output of the 4×2 WL filter.

The present disclosure provides, as a second aspect, a receiver. The receiver includes: a detector configured to coherently receive a polarization-multiplexed optical signal transmitted from a transmitter via a transmission line; and a digital signal processing circuit configured to perform equalization signal processing on the reception signal coherently received. The digital signal processing circuit includes: a carrier phase compensation filter configured to compensate for a carrier phase in the reception signal, a 4×2 widely linear (WL) filter disposed after the carrier phase compensation filter and configured to compensate for distortion included in the polarization-multiplexed optical signal, and a filter coefficient updating unit configured to update a filter coefficient of the carrier phase compensation filter and a filter coefficient of the 4×2 WL filter with use of an output of the 4×2 WL filter.

The present disclosure provides, as a third aspect, a communication system. The communication system includes: a transmitter configured to transmit a polarization-multiplexed optical signal via a transmission line; and a receiver configured to receive the transmitted polarization-multiplexed optical signal. The receiver includes: a detector configured to coherently receive the polarization-multiplexed optical signal transmitted from the transmitter, and a digital signal processing circuit configured to perform equalization signal processing on the reception signal coherently received. The digital signal processing circuit includes: a carrier phase compensation filter configured to compensate for a carrier phase in the reception signal, a 4×2 widely linear (WL) filter disposed after the carrier phase compensation filter and configured to compensate for distortion included in the polarization-multiplexed optical signal, and a filter coefficient updating unit configured to update a filter coefficient of the carrier phase compensation filter and a filter coefficient of the 4×2 WL filter with use of an output of the 4×2 WL filter.

The present disclosure provides, as a fourth aspect, a digital signal processing method. The digital signal processing method includes: in a carrier phase compensation filter, compensating for a carrier phase in a polarization-multiplexed optical signal transmitted from a transmitter and received by a receiver; in a 4×2 widely linear (WL) filter disposed after the carrier phase compensation filter, compensating for distortion included in the polarization-multiplexed optical signal; and updating a filter coefficient of the carrier phase compensation filter and a filter coefficient of the 4×2 WL filter with use of an output of the 4×2 WL filter.

Advantageous Effects of Invention

The digital signal processing circuit, the method, the receiver, and the communication method according to the present disclosure are capable of compensation and polarization separation of polarization mode dispersion as well as in-transmitter distortion compensation with a low tap count.

BRIEF DESCRIPTION OF DRAWINGS

FIG. 7 is a graph showing a distribution of signals of the I-channel and the Q-channel observed when the Tx load is not compensated for:

FIG. 7 is a graph showing a distribution of signals of the I-channel and the Q-channel observed when the Tx load is compensated for:

EXAMPLE EMBODIMENT

Figure 1:
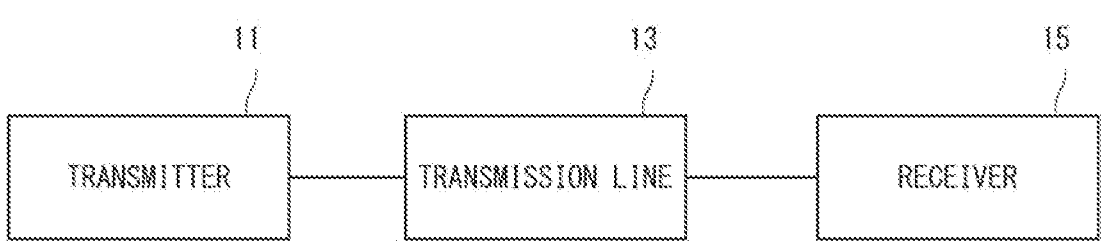
FIG. 1 is a block diagram schematically showing a communication system according to the present disclosure.

An outline of the present disclosure will be given prior to the description of some example embodiments of the present disclosure. FIG. 1 schematically shows a communication system according to the present disclosure. A communication system 10 includes a transmitter 11 and a receiver 15. The transmitter 11 and the receiver 15 are connected to each other via a transmission line 13. The transmitter 11 transmits a polarization-multiplexed optical signal via the transmission line 13. The receiver 15 receives a polarization-multiplexed optical signal from the transmitter 11 via the transmission line 13.

Figure 2:
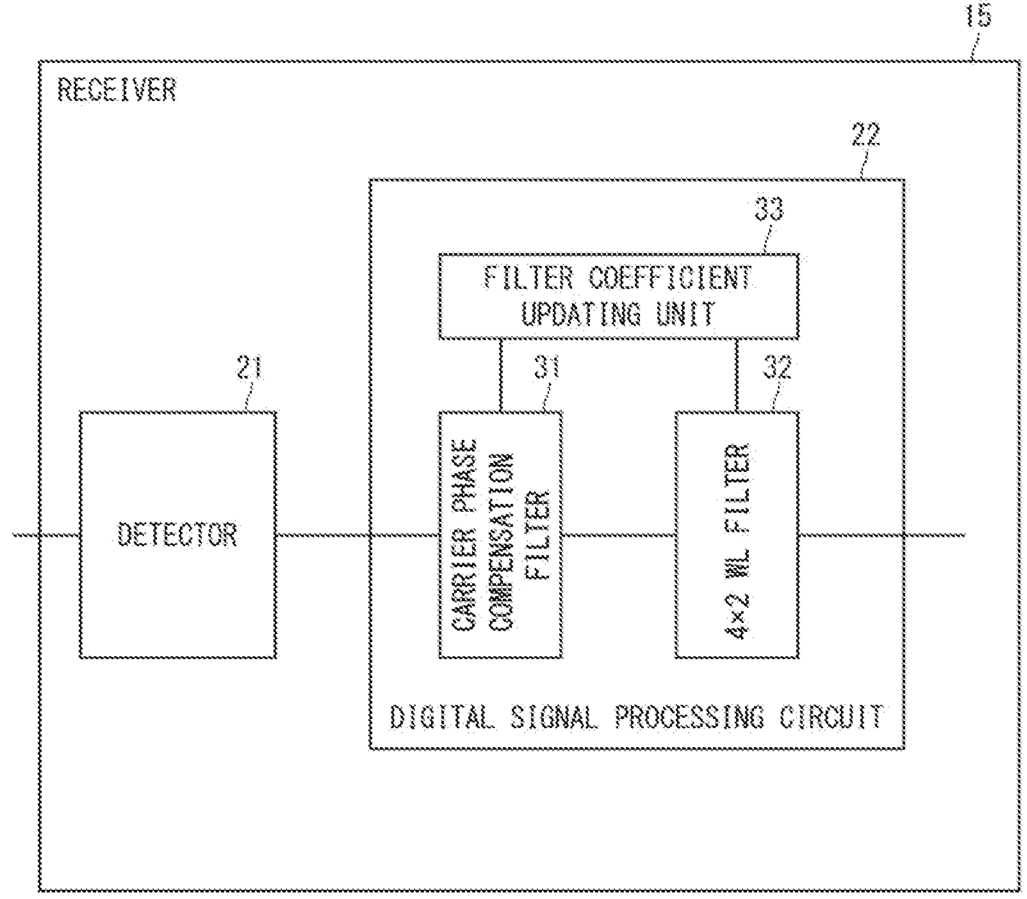
FIG. 2 is a block diagram showing a schematic configuration of a receiver.

FIG. 2 shows a schematic configuration of the receiver 15. The receiver includes a detector 21 and a digital signal processing circuit 22. The detector 21 coherently receives a polarization-multiplexed optical signal transmitted from a transmitter. The digital signal processing circuit 22 performs equalization signal processing on a reception signal coherently received by the detector 21.

The digital signal processing circuit 22 includes a carrier phase compensation filter 31, a 4×2 WL filter 32, and a filter coefficient updating unit 33. The carrier phase compensation filter 31 compensates for a carrier phase of a reception signal, that is, a polarization-multiplexed signal. The 4×2 WL filter 32 is disposed after the carrier phase compensation filter 31. The 4×2 WL filter 32 compensates for distortion in a reception signal. The filter coefficient updating unit 33 updates the filter coefficient of the carrier phase compensation filter 31 and the filter coefficient of the 4×2 WL filter 32 with the use of an output of the 4×2 WL filter 32.

According to the present disclosure, when carrier phase compensation is performed at a stage before the 4×2 WL filter 32, the 4×2 WL filter 32 can perform the compensation of in-transmitter distortion (Tx load) and the polarization mode dispersion compensation and polarization separation at once. Therefore, as compared to the case in which a separate filter is disposed for polarization mode dispersion and polarization separation, the tap count can be reduced. Accordingly, the present disclosure can reduce the circuit size of the digital signal processing circuit.

Figure 3:
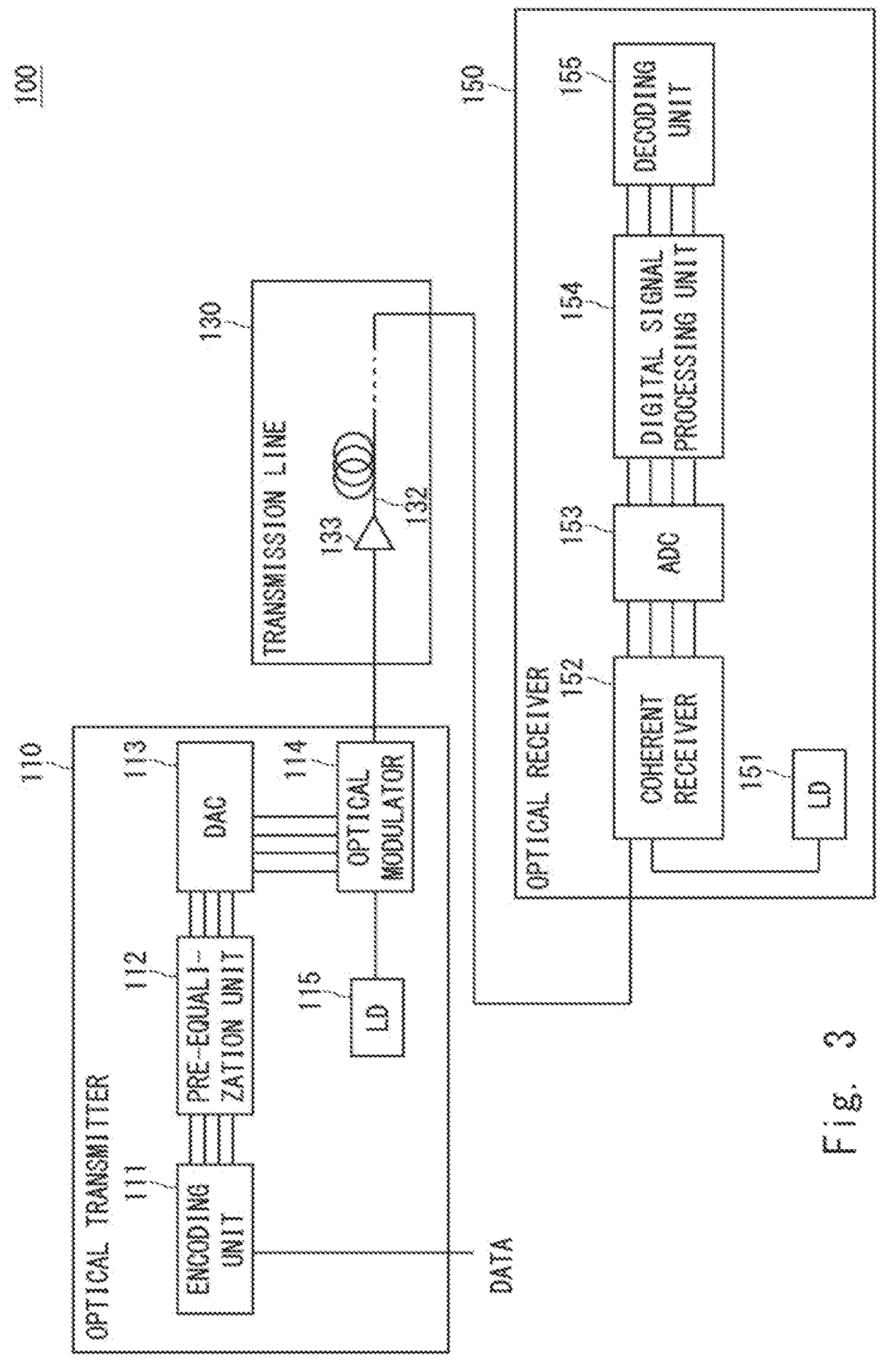
FIG. 3 is a block diagram showing a signal transmission system according to a first example embodiment of the present disclosure.

Example embodiments of the present disclosure will be described below in detail. FIG. 3 shows a signal transmission system according to a first example embodiment of the present disclosure. According to the present example embodiment, the signal transmission system is assumed to be an optical fiber communication system employing a polarization-multiplexing QAM scheme and performing coherent reception. An optical fiber communication system 100 includes an optical transmitter 110, a transmission line 130, and an optical receiver 150. The optical fiber communication system 100 constitutes, for example, a submarine fiber-optic cable system. The optical fiber communication system 100 corresponds to the communication system 10 shown in FIG. 1. The optical transmitter 110 corresponds to the transmitter 11 shown in FIG. 1. The transmission line 130 corresponds to the transmission line 13 shown in FIG. 1. The optical receiver 150 corresponds to the receiver 15 shown in FIG. 1.

The optical transmitter 110 converts a plurality of pieces of transmission data into a polarization-multiplexed optical signal. The optical transmitter 110 includes an encoding unit 111, a pre-equalization unit 112, a digital-analog converter (DAC) 113, an optical modulator 114, and a laser diode (LD) 115. The encoding unit 111 encodes data. The encoding unit 111 outputs, for example, a four-sequence signal of the in-phase (I) components and the quadrature (Q) components of each of the X-polarization (first polarization) and the Y-polarization (second polarization).

The pre-equalization unit 112 performs, on the encoded four-sequence signal, pre-equalization of compensating in advance for distortion or the like of the device in the optical transmitter. The DAC 113 converts the pre-equalized four-sequence signal to respective analog electrical signals.

The LD 115 outputs continuous-wave (CW) light. The optical modulator 114 modulates the CW light output from the LD 115 in accordance with the four-sequence signal output from the DAC 113, and generates a polarization-multiplexed optical signal. The optical modulator 114 generates, for example, a polarization-multiplexed QAM signal. The optical modulator 114 sends out the polarization-multiplexed optical signal to the transmission line 130.

The transmission line 130 transmits the polarization-multiplexed optical signal output from the optical transmitter 110 to the optical receiver 150. The transmission line 130 includes an optical fiber 132 and an optical amplifier 133. The optical fiber 132 guides the optical signal transmitted from the optical transmitter 110. The optical amplifier 133 amplifies the optical signal and compensates for the propagation loss in the optical fiber 132. The optical amplifier 133 is configured, for example, as an erbium-doped fiber amplifier (EDFA). The transmission line 130 may include a plurality of optical amplifiers 133.

The optical receiver 150 includes an LD 151, a coherent receiver 152, an analog-digital converter (ADC) 153, a digital signal processing unit 154, and a decoding unit 155. In the optical receiver 150, circuits such as the digital signal processing unit 154 and the decoding unit (decoder) 155 may be constituted by a device such as a digital signal processor (DSP).

The LD 151 outputs CW light that serves as local oscillator light. The coherent receiver 152 is configured as a coherent receiver of a polarization diversity type. The coherent receiver 152 performs coherent detection of an optical signal transmitted through the optical fiber 132, with the use of the CW light output from the LD 151. The coherent receiver 152 outputs a four-sequence reception signal (electrical signal) corresponding to the I components and the Q components of the X-polarization and the Y-polarization that have been coherently detected. The coherent receiver 152 corresponds to the detector 21 shown in FIG. 2.

The ADC 153 samples the reception signal output from the coherent receiver 152 and converts the reception signal to a signal in a digital range. The digital signal processing unit 154 performs digital signal processing on the four-sequence reception signal sampled by the ADC 153, and demodulates the reception signal. The digital signal processing unit 154 may include one or more processors and one or more memories. At least part of the functions of the digital signal processing unit 154 may be realized as a processor operates in accordance with a program read out from a memory. The digital signal processing unit 154 corresponds to the digital signal processing circuit 22 shown in FIG. 2. The decoding unit 155 performs decoding of the demodulated signal and restores the transmitted data.

Figure 4:
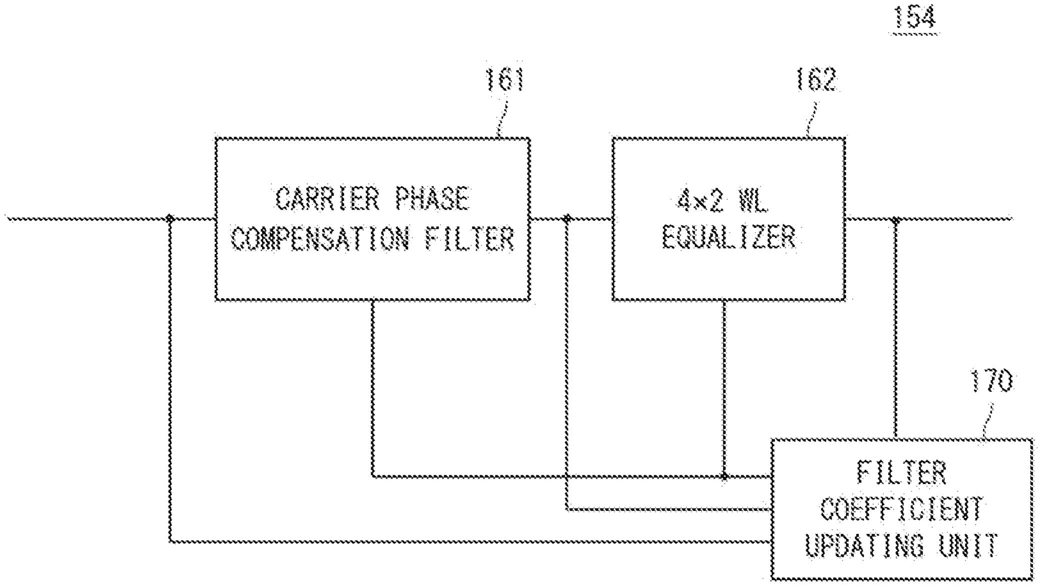
FIG. 4 is a block diagram showing an example of a basic configuration of a digital signal processing unit.

FIG. 4 shows an example of a basic configuration of the digital signal processing unit 154 that performs a digital signal processing method. The digital signal processing unit 154 includes a carrier phase compensation filter 161, a 4×2 WL equalizer (WL filter) 162, and a filter coefficient updating unit 170. In the digital signal processing unit 154, the carrier phase compensation filter 161 and the 4×2 WL equalizer 162 are connected in series to an input signal. The digital signal processing unit 154 may include, for example, one or more filters that are disposed before the carrier phase compensation filter 141 and that compensate for distortion in an input signal. The carrier phase compensation filter 161 corresponds to the carrier phase compensation filter 31 shown in FIG. 2. The 4×2 WL equalizer 162 corresponds to the 4×2 WL filter 32 shown in FIG. 2.

The filter coefficient updating unit 170 monitors the output of the 4×2 WL equalizer 162 and the input of the carrier phase compensation filter 161. Furthermore, the filter coefficient updating unit 170 monitors the output of the carrier phase compensation filter 161, that is, the input of the 4×2 WL equalizer 162. With the use of the output of the 4×2 WL equalizer 162, the filter coefficient updating unit 170 updates the filter coefficient of the carrier phase compensation filter 161 and the filter coefficient of the 4×2 WL equalizer 162. The filter coefficient updating unit 170 adaptively controls the coefficient of the 4×2 WL equalizer 162 through error backpropagation method based, for example, on a predetermined loss function. The loss function is calculated based on the difference between a desired state and an output signal of the 4×2 WL equalizer 162, the final-stage filter. The filter coefficient updating unit 170 corresponds to the filter coefficient updating unit 33 shown in FIG. 2.

Figure 5:
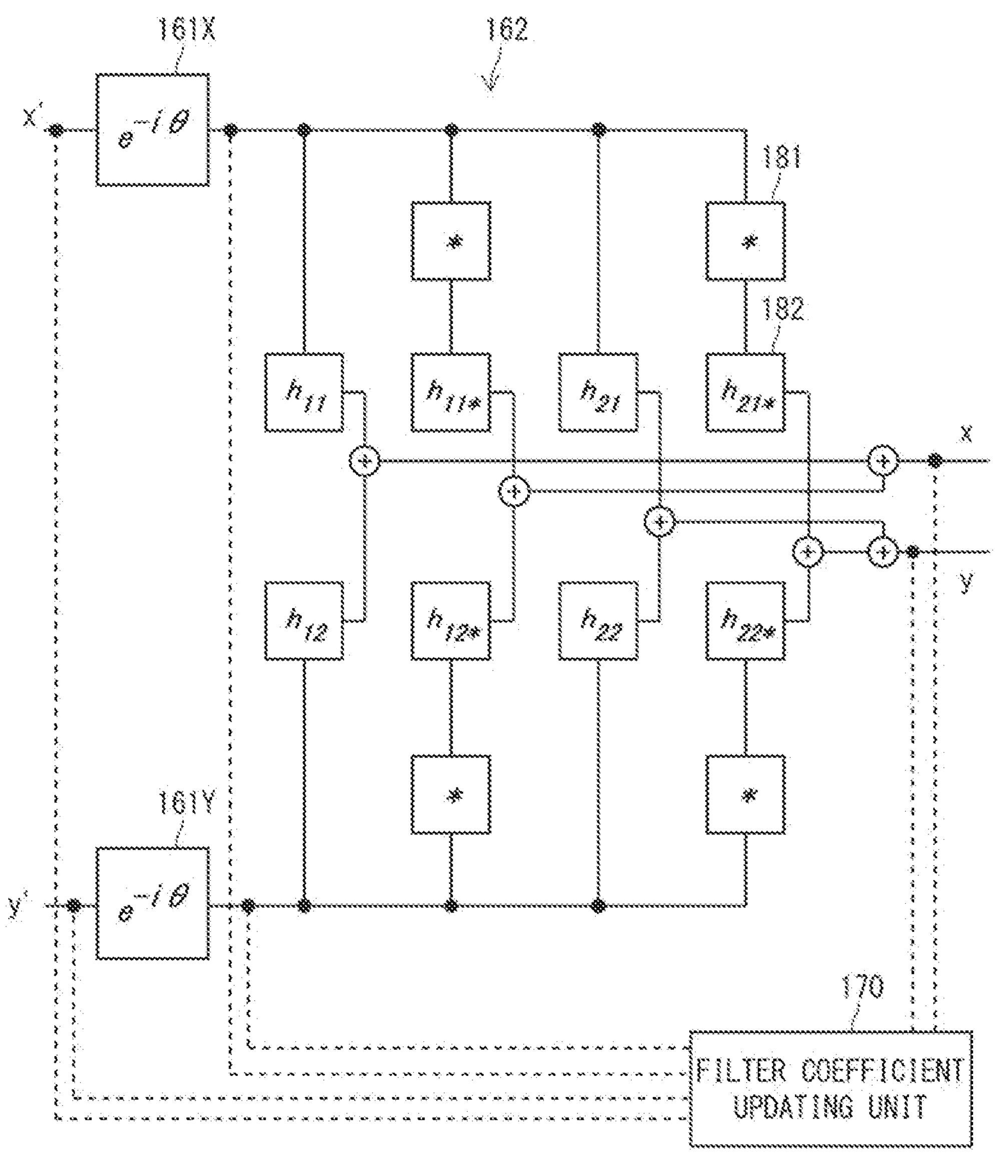
FIG. 5 is a block diagram showing an example of a more detailed configuration of a digital signal processing unit.

FIG. 5 shows an example of a more detailed configuration of the digital signal processing unit 154. The carrier phase compensation filter 161 receives input of complex data of the X-polarization and complex data of the Y-polarization obtained by converting the IQ components of the X-polarization and the IQ components of the Y-polarization into respective complex signals. The carrier phase compensation filter 161 compensates for signal distortion resulting from the frequency offset and the phase offset between the carrier of a transmission optical signal and local oscillator light on the receiver side. The carrier phase compensation filter 161 includes a carrier phase compensation filter 161X corresponding to the X-polarization and a carrier phase compensation filter 161Y corresponding to the Y-polarization. For the carrier phase compensation filter 161X and the carrier phase compensation filter 161Y, an SL 1×1 one tap finite impulse response (FIR) filter, for example, is used.

The 4×2 WL equalizer 162 includes complex conjugate converting units 181 disposed so as to correspond to the respective polarizations and a total of eight complex coefficient filters 182 constituting a WL multiple-input and multiple-output (MIMO) filter. The complex conjugate converting units 181 convert the complex data of the X-polarization and the complex data of the Y-polarization output from the carrier phase compensation filter 161 into, respectively, complex conjugate data of the X-polarization and complex conjugate data of the Y-polarization. The complex data of the X-polarization, the complex conjugate data of the Y-polarization, the complex conjugate data of the X-polarization, and the complex conjugate data of the Y-polarization are input to the complex coefficient filters 182 constituting the WL MIMO filter. Each complex coefficient filter 182 is constituted as an FIR filter. In the 4×2 WL equalizer 162, the tap count of each FIR filter is selected in accordance with the distortion to be compensated for.

Herein, a WL 4×2 MIMO filter is equivalent to a real signal-input real coefficient 4×4 MIMO filter having 4×4=16 real coefficient filters. According to the present disclosure, a complex coefficient MIMO filter receiving input of a complex signal and its complex conjugate and an equivalent real signal-input real coefficient MIMO filter are collectively referred to as a WL MIMO filter. In this context, a normal complex signal-input complex coefficient MIMO filter is referred to as an SL MIMO filter.

The filter coefficient updating unit 170 updates the coefficient of the complex coefficient filters 182 of the 4×2 WL equalizer 162 so as to minimize the loss function described above. The filter coefficient updating unit 170 updates the coefficient of each filter so as to minimize the loss function calculated based on the filter output of the 4×2 WL equalizer 162, through, for example, stochastic gradient descent. The filter coefficient updating unit 170 calculates the coefficient of the carrier phase compensation filter 161, that is, the phase compensation amount in the carrier phase compensation filter 161 based on the output of the 4×2 WL equalizer 162. The phase compensation amount can be calculated with the use of a typical Mth-power method or a digital phase-locked loop (PLL) using tentative determination.

Figure 6:
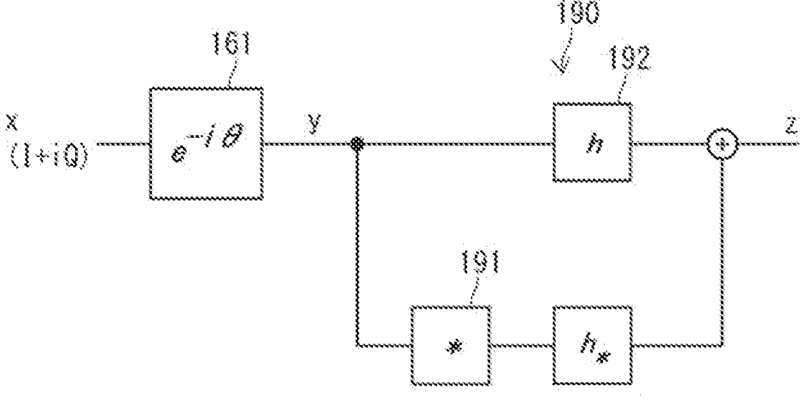
FIG. 6 is a block diagram showing an example of a configuration of digital signal processing used for description.

The updating of the filter coefficient of the 4×2 WL equalizer 162 of the digital signal processing unit 154 will be described below. In the following, the update of the filter coefficient for one of the polarizations will be described. FIG. 6 shows an example of a configuration of digital signal processing used for the description. In FIG. 6, in place of the 4×2 WL equalizer 162 (see FIG. 5), a 2×1 WL equalizer (2×1 WL MIMO filter) 190 is used in the digital signal processing. The 2×1 WL equalizer 190 includes a complex conjugate converting unit 191 and two complex coefficient filters 192. The 4×2 WL equalizer 162 has a configuration in which the 2×1 WL equalizer 190 is expanded for polarization multiplexing. Therefore, the operation principle in updating the coefficient of the 4×2 WL equalizer 162 is the same as the operation principle in updating the filter coefficient of the 2×1 WL equalizer 190.

When the input of the carrier phase compensation filter 161 is denoted by x (=I+iQ), the output $y_i[k]$ of the carrier phase compensation filter 161 is expressed by the equation below.

$$y_j[k] = e^{-i\theta_j} x_j[k]$$

In the above, j denotes the number of dimensions of the input, i denotes the number of dimensions of the output, and k denotes the sample. Meanwhile, $e^{-i\theta j}$ represents the phase compensation coefficient. The output $z_i[k]$ of the 2×1 WL equalizer is expressed by the equation below.

$$z_i[k] = \sum_{j,m} \left(h_{ij}[m] y_j[k-m] + h_{*ij}[m] y_j^*[k-m]\right)$$

In the above, $y_i^*$ denotes the complex conjugate of $y_i$, and m denotes the tap count of the FIR filter. The loss function φ[k] used to update the filter coefficient is defined by the equation below, with $d_i[k]$ representing a desired 5 state being a training signal.

$$\phi[k] = \sum_i |d_i[k] - z_i[k]|^2.$$

The filter coefficient of the 2×1 WL equalizer 190 is updated with the use of stochastic gradient descent so as to minimize the loss function above.

$$\begin{aligned}
\frac{\partial \phi[k]}{\partial h_{ij}[m]} &= \frac{\partial}{\partial h_{ij}[m]} |d_i[k] - z_i[k]|^2 \\
&= \frac{\partial}{\partial h_{ij}[m]} (d_i[k] - z_i[k])(d_i[k]^* - z_i[k]^*) \\
&= \frac{\partial}{\partial h_{ij}[m]} (d_i[k] - z_i[k]) e_i^* \\
&= e_i^* \frac{\partial}{\partial h_{ij}[m]} (d_i[k] - z_i[k]) \\
&= -e_i^* \frac{\partial}{\partial h_{ij}[m]} z_i[k] \\
&= -e_i^* y_j[k-m] \\
&= \frac{\partial \phi[k]}{\partial h_{ij}} = -e_i^* y_j[k] \\
&= \frac{\partial \phi[k]}{\partial (h_{ij})^*} = -e_i^* y_j[k] \\
&= \frac{\partial \phi[k]}{\partial h_{*ij}} = -e_i^* y_j^*[k] \\
&= \frac{\partial \phi[k]}{\partial (h_{*ij})^*} = -e_i y_j[k]
\end{aligned}$$

Based on the above, each filter coefficient after the update is given by the expressions below, with a being the step size that controls the scale of the update.

$$h_{ij} \rightarrow h_{ij} - 2\alpha \frac{\partial \phi[k]}{\partial (h_{ij})^*}$$

$$h_{ij} \rightarrow h_{ij} + 2\alpha e_i y_i^*[k]$$

$$h_{*ij} \rightarrow h_{*ij} - 2\alpha \frac{\partial \phi[k]}{\partial (h_{*ij})^*}$$

$$h_{*ij} \rightarrow h_{*ij} + 2\alpha e_i y_i[k]$$

$\theta_j$ in the phase compensation coefficient $e^{-i\theta_j}$ denotes the phase compensation amount. The phase compensation amount $\theta_j$ is calculated separately based on φ[k]. The phase compensation amount includes the frequency offset and the phase error. The phase compensation amount is calculated with the use of, for example, a digital PLL using a typical training signal.

According to the present example embodiment, the digital signal processing unit 154 includes the carrier phase compensation filter 161 and the 4×2 WL equalizer 162. The filter coefficient updating unit 170 updates the coefficient of the carrier phase compensation filter 161 and the coefficient of the 4×2 WL equalizer 162 with the use of an output signal of the 4×2 WL equalizer 162. According to the present example embodiment, the carrier phase compensation filter 161 is disposed before the 4×2 WL equalizer 162, and the 4×2 WL equalizer 162 equalizes the signal whose carrier phase has been compensated for. As such a configuration is employed, the digital signal processing unit 154 can perform the compensation and polarization separation of polarization mode dispersion (PMD) as well as the compensation of the Tx load at once.

Figure 14:
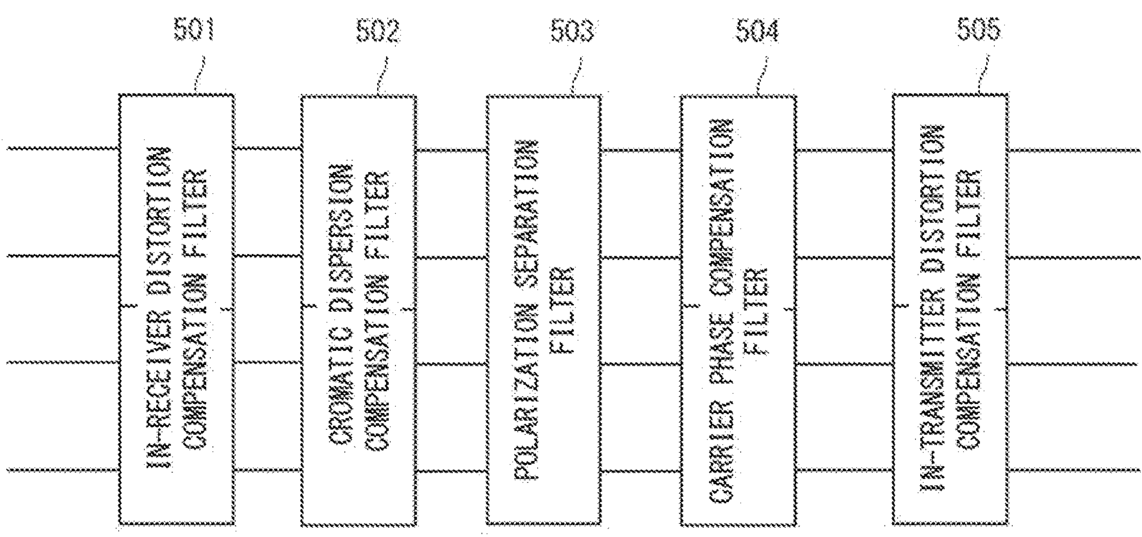
FIG. 14 is a block diagram showing equalization digital signal processing.

In, for example, the equalization digital signal processing shown in FIG. 14, the polarization fluctuation is compensated for by the polarization separation filter 503, the carrier phase is compensated for by the carrier phase compensation filter 504, and the Tx load is compensated for by the in-transmitter distortion compensation filter 505. In this case, to achieve adaptive equalization corresponding to high-accuracy Tx compensation and high PMD, a filter with a long tap length is necessary for each filter. For example, when the tap count of the polarization separation filter 503 is m and the tap count of the in-transmitter distortion compensation filter 505 is m, the tap length of a filter necessary for polarization mode dispersion compensation and Tx load compensation is 2 m. In contrast, according to the present example embodiment, polarization mode dispersion compensation and Tx load compensation can be performed at once by the 4×2 WL equalizer 162. Therefore, according to the present example embodiment, the tap length of a filter necessary for polarization mode dispersion compensation and Tx load compensation is m. In this manner, the present example embodiment makes it possible to integrate two adaptive filters with a long tap length into a single filter and can achieve equalization digital signal processing with a small circuit size.

The present inventor has conducted simulation to verify the effect of equalization in the digital signal processing unit 154. Used in the simulation is a 130 GB (Baud) polarization-multiplexed 64 QAM signal. To this signal, 100 kHz noise is added as phase noise to each of the transmitter-side LD and the local oscillator light, and a 0.5 UI (Unit Interval) IQ skew is added to the Q signal of the X-polarization in the transmitter.

Figure 7:
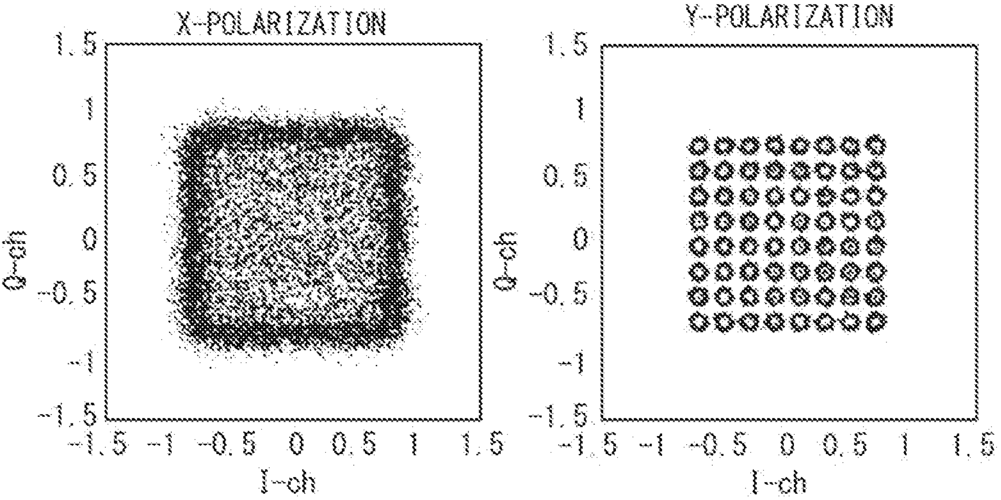

FIG. 7 shows a distribution of signals of the I-channel and the Q-channel observed when the Tx load is not compensated for in the equalization digital signal processing. In the simulation, a signal converted to a digital signal by an ADC is equalized with the use of the polarization separation filter 503 and the carrier phase compensation filter 504 shown in FIG. 14. In this case, the Tx load is not compensated for in the equalization digital signal processing, and this makes it difficult to differentiate the signal points in the X-polarization.

Figure 8:
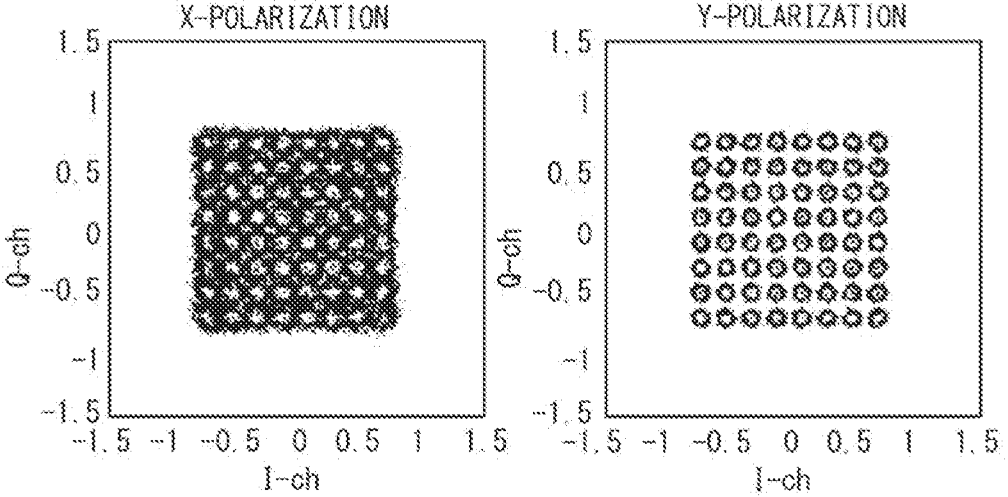

FIG. 8 shows a distribution of signals of the I-channel and the Q-channel observed when the Tx load is compensated for in the equalization digital signal processing. In the simulation, a signal converted to a digital signal by an ADC is equalized with the use of the polarization separation filter 503, the carrier phase compensation filter 504, and the transmitter distortion compensation filter 505 shown in FIG. 14. In this case, no distortion is observed in the Y-polarization signal to which no skew has been added. However, although improvement in the reception characteristics can be observed of the X-polarization signal as compared to the case shown in FIG. 7, the reception characteristics are not sufficiently high.

Figure 9:
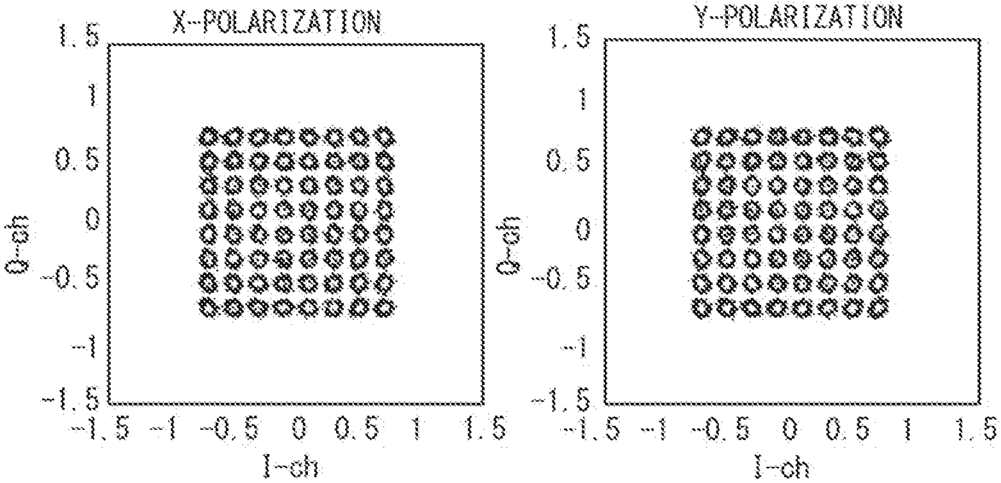
FIG. 9 is a graph showing a distribution of signals of the I-channel and the Q-channel observed when a digital signal processing unit according to an example embodiment is used.

FIG. 9 shows a distribution of signals of the I-channel and the Q-channel observed when the digital signal processing unit 154 according to the present example embodiment is used. Comparison of FIG. 9 with FIGS. 7 and 8 shows that the reception characteristics of the X-polarization signals improve when the digital signal processing unit 154 is used. In this manner, the simulation has confirmed that, even with no separately disposed polarization separation filter, the digital signal processing unit 154 can compensate for the polarization fluctuation and the Tx load at once.

Figure 10:
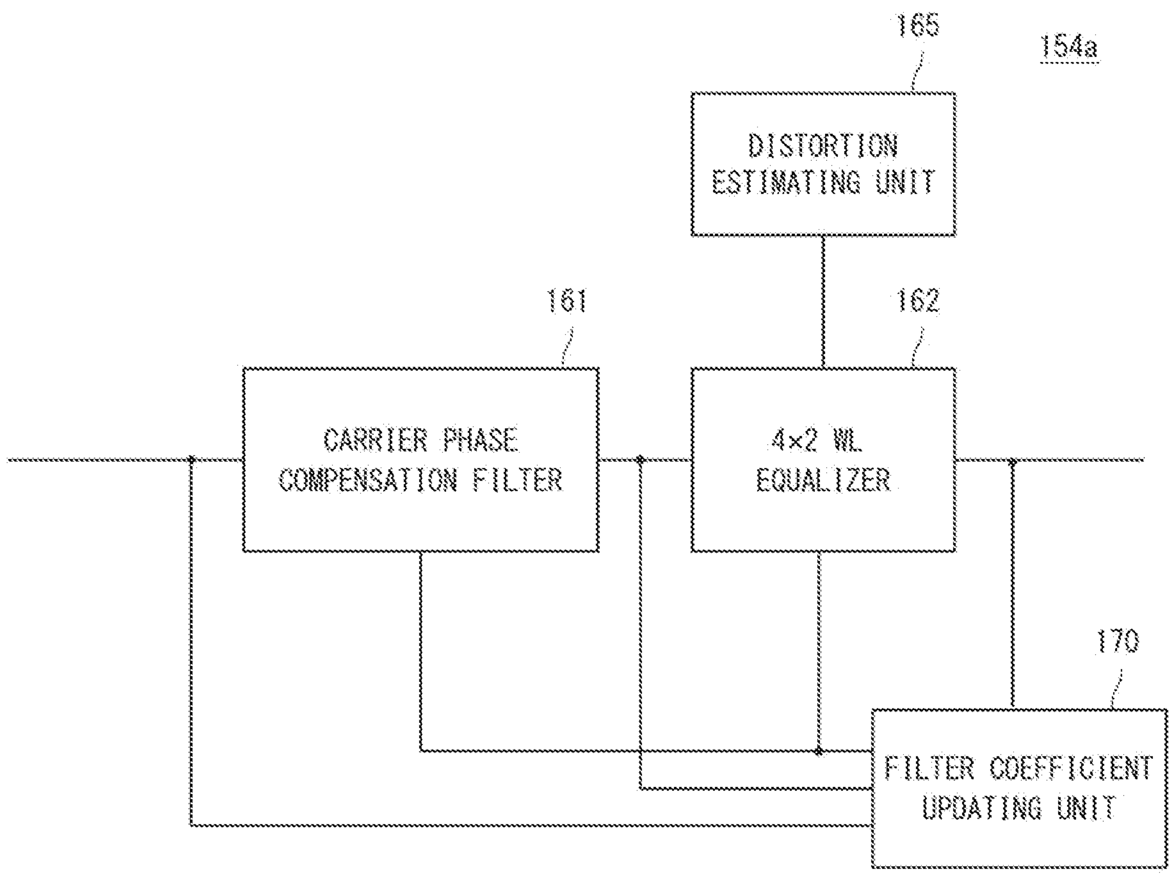
FIG. 10 is a block diagram showing an example of a configuration of a digital signal processing unit used in a second example embodiment of the present disclosure.

Next, a second example embodiment of the present disclosure will be described. FIG. 10 shows an example of a configuration of a digital signal processing unit used in the second example embodiment of the present disclosure. According to the present example embodiment, a digital signal processing unit 154*a* includes, in addition to the components of the digital signal processing unit 154 shown in FIG. 4, a distortion estimating unit 165. The distortion estimating unit 165 estimates the Tx load based on the filter coefficient of the 4×2 WL equalizer 162. The filter coefficients in the digital signal processing unit 154*a* may be updated in a manner similar to how the filter coefficients are updated according to the first example embodiment.

Figure 11:
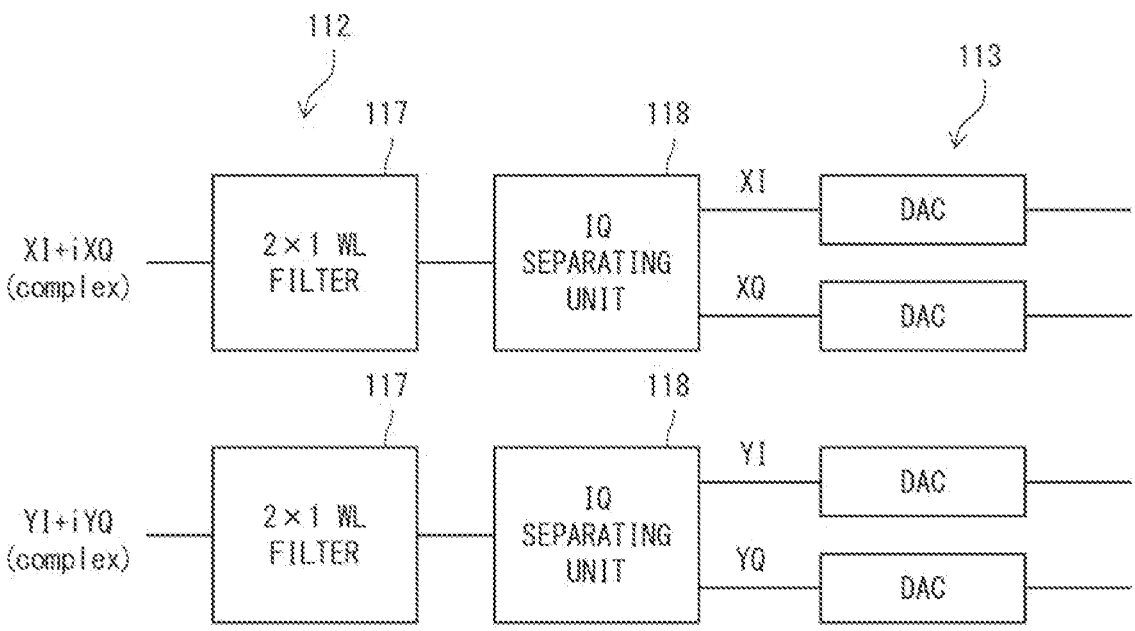
FIG. 11 is a block diagram showing part of a configuration of an optical transmitter.

According to the present example embodiment, the filter coefficient of the pre-equalization unit 112 of the optical transmitter 110 is controlled based on the filter coefficients in the digital signal processing unit 154*a* on the receiver side. FIG. 11 shows part of a configuration of the optical transmitter 110. The optical transmitter 110 includes a 2×1 WL filter 117 and an IQ separating unit 118 corresponding to each of the X-polarization and the Y-polarization. The 2×1 WL filters 117 correspond to the pre-equalization unit 112 shown in FIG. 3. The 2×1 WL filter 117 disposed for the X-polarization receives input of a complex signal (XI+iXQ) of the X-polarization. An output signal of this 2×1 WL filter 117 is separated into an I-component real signal and a Q-component real signal in the IQ separating unit 118, and these signals are converted to analog signals by the DACs 113. The 2×1 WL filter 117 disposed for the Y-polarization receives input of a complex signal (YI+iYQ) of the Y-polarization. An output signal of this 2×1 WL filter 117 is separated into an I-component real signal and a Q-component real signal in the IQ separating unit 118, and these signals are converted to analog signals by the DACs 113.

According to the present example embodiment, the distortion estimating unit 165 (see FIG. 10) estimates the Tx load from the filter coefficient of the 4×2 WL equalizer 162 held after the coefficient convergence. The Tx load can be calculated based on the complex coefficient filter 182 shown in FIG. 5. According to the present example embodiment, the filter coefficient of the 2×1 WL filter of the pre-equalization unit 112 is set so that the characteristics reverse to the characteristics of the Tx load estimated by the distortion estimating unit 165 are added to the signal to be transmitted in the pre-equalization unit 112. As the filter coefficient of the pre-equalization unit 112 is set in accordance with the Tx load estimated on the receiver side, the Tx load can be compensated for on the transmitter side.

Herein, if the types of the filters differ between the digital signal processing unit 154*a* on the receiver side and the pre-equalization unit 112 on the transmitter side, the coefficients may be converted. For example, in one case contemplated, a 4×2 WL MIMO filter is used in the digital signal processing unit 154*a*, and a 2×2 Real MIMO filter is used in the pre-equalization unit 112. In this case, the reverse characteristics of the Tx load estimated from the 4×2 WL MIMO filter may be converted to the coefficient of the 2×2 Real MIMO filter.

Figure 12:
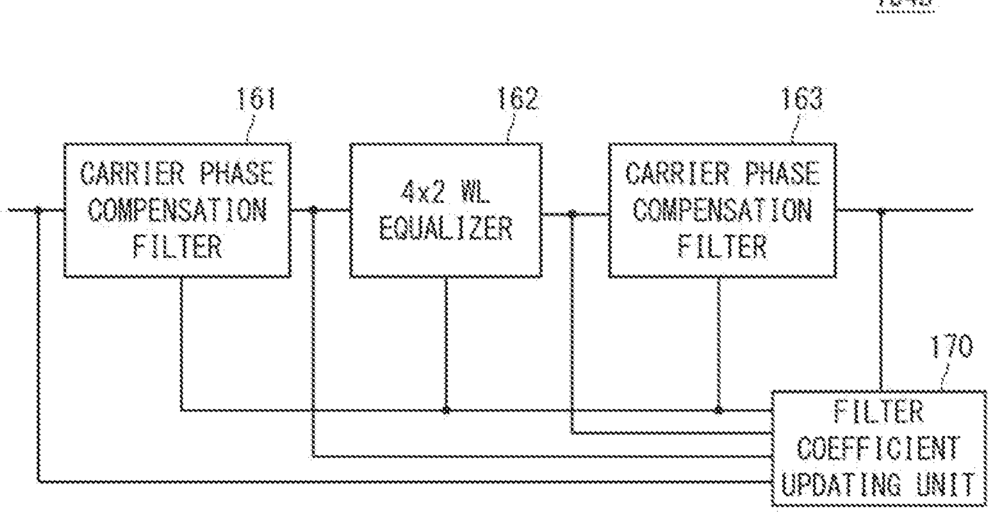
FIG. 12 is a block diagram showing an example of a configuration of a digital signal processing unit used in a third example embodiment of the present disclosure.

Next, a third example embodiment of the present disclosure will be described. FIG. 12 shows an example of a configuration of a digital signal processing unit used in the third example embodiment of the present disclosure. According to the present example embodiment, a digital signal processing unit 154*b* includes, in addition to the components of the digital signal processing unit 154 shown in FIG. 4, a carrier phase compensation filter 163 disposed after the 4×2 WL equalizer 162.

According to the present example embodiment, the filter coefficient updating unit 170 updates the filter coefficient of either one of the carrier phase compensation filter (first carrier phase compensation filter) 161 and the carrier phase compensation filter (second carrier phase compensation filter) 163. The filter coefficient updating unit 170 prevents the other one of the carrier phase compensation filter 161 and the carrier phase compensation filter 163 from performing carrier phase compensation and lets an input signal output as it is. To put it in another way, the filter coefficient updating unit 170 causes either one of the carrier phase compensation filter 161 and the carrier phase compensation filter 163 to operate and prevents the other one of the carrier phase compensation filter 161 and the carrier phase compensation filter 163 from operating.

When the filter coefficient updating unit 170 causes the carrier phase compensation filter 161 to operate, carrier phase compensation is performed at a stage before the 4×2 WL equalizer 162 in the digital signal processing unit 154*b*. Meanwhile, when the filter coefficient updating unit 170 causes the carrier phase compensation filter 163 to operate, carrier phase compensation is performed at a stage after the 4×2 WL equalizer 162 in the digital signal processing unit 154*b*. In this manner, the digital signal processing unit 154*b* is configured to be capable of selecting whether to perform carrier phase compensation at a stage before the 4×2 WL equalizer 162 or after the 4×2 WL equalizer 162.

Compensation of distortion by the 4×2 WL equalizer 162 will be described with respect to a case in which carrier phase compensation is performed at a stage before the 4×2 WL equalizer 162 and a case in which carrier phase compensation is performed at a stage after the 4×2 WL equalizer 162. In the following, compensation of distortion in the case of one of the polarizations will be described, with the 4×2 WL equalizer 162 (see FIG. 5) replaced by the 2×1 WL equalizer 190 (see FIG. 6). As described above, the 4×2 WL equalizer 162 has a configuration in which the 2×1 WL equalizer 190 is expanded for polarization multiplexing. Therefore, the operation principle in distortion compensation by the 4×2 WL equalizer 162 is the same as the operation principle in distortion compensation by the 2×1 WL equalizer 190.

First, a case in which carrier phase compensation is performed by the carrier phase compensation filter 163 disposed after the 2×1 WL equalizer will be described. When the input of the 2×1 WL equalizer is denoted by x (complex signal), the output of the carrier phase compensation filter 163 is denoted by y, and the phase compensation coefficient is denoted by $e^{-i\theta}$, y and x satisfy the equations below.

$$y = (hx + h_* x^*)e^{-i\theta}$$

$$ye^{i\theta} = (hx + h_* x^*)$$

The IQ representation of $ye^{i\theta}$ above is expressed as in the following.

$$\begin{bmatrix} \cos\theta & -\sin\theta \\ \sin\theta & \cos\theta \end{bmatrix}\begin{bmatrix} y_I \\ y_Q \end{bmatrix}.$$

The relationship between the $y_I$ and $y_Q$ and the $x_I$ and $x_Q$ is expressed by the equation below.

$$\begin{bmatrix} y_I \\ y_Q \end{bmatrix} = H\begin{bmatrix} y_I \\ y_Q \end{bmatrix}.$$

The equation above yields $$\begin{bmatrix} y_I \\ y_Q \end{bmatrix} = \begin{bmatrix} \cos\theta & \sin\theta \\ -\sin\theta & \cos\theta \end{bmatrix} H \begin{bmatrix} x_I \\ x_Q \end{bmatrix}.$$

In this case, the phase error is compensated for after the IQ distortion is compensated for. In this case, the effect produced in the receiver-side device (also referred to below as "Rx load") is compensated for by the 2×1 WL equalizer.

Next, a case in which carrier phase compensation is performed by the carrier phase compensation filter 161 disposed before the 2×1 WL equalizer will be described. When the input of the carrier phase compensation filter 161 is denoted by x (complex signal), the output is denoted by X', the output of the 2×1 WL equalizer is denoted by y, and the phase compensation coefficient is denoted by $e^{-i\theta}$, y and x satisfy the equations below.

$$x' = xe^{-i\theta}$$

$$\begin{aligned} y &= hx' + h_* x'^* \\ &= h(xe^{-i\theta}) + h_*(xe^{-i\theta})^* \end{aligned}$$

This case yields $$\begin{bmatrix} y_I \\ y_Q \end{bmatrix} = H\begin{bmatrix} \cos\theta & \sin\theta \\ -\sin\theta & \cos\theta \end{bmatrix}\begin{bmatrix} x_I \\ x_Q \end{bmatrix}.$$

In this case, the IQ distortion is compensated for after the phase error is compensated for. In this case, the Tx load is compensated for by the 2×1 WL equalizer.

For example, a system operator or the like determines in which of the carrier phase compensation filter 161 and the carrier phase compensation filter 163 carrier phase compensation is to be performed in accordance with the ratio of the Rx load and the Tx load in the system. The filter coefficient updating unit 170 outputs the phase compensation amount θ=0 to the carrier phase compensation filter determined not to perform the carrier phase compensation.

For example, when the Tx load is dominant, the filter coefficient updating unit 170 fixes the phase compensation amount to be output to the carrier phase compensation filter 163 at θ=0. The filter coefficient updating unit 170 updates the filter coefficient of the carrier phase compensation filter 161 with the use of the output of the 4×2 WL equalizer 162. Meanwhile, when the Rx load is dominant, the filter coefficient updating unit 170 fixes the phase compensation amount to be output to the carrier phase compensation filter 161 at θ=0. The filter coefficient updating unit 170 updates the filter coefficient of the carrier phase compensation filter 163 with the use of the output of the 4×2 WL equalizer 162. With this configuration, whether the Rx load is to be compensated for or the Tx load is to be compensated for in the digital signal processing unit 154*b* can be selected.

In the example described according to the second example embodiment, the assumption is that the filters for the digital signal processing are disposed in the digital signal processing unit 154*a*. The present disclosure, however, is not limited to this example. As a modified example, part or the whole of the digital signal processing shown in FIG. 4 or 5 may be provided in hardware different from the digital signal processing unit 154*a*.

Figure 13:
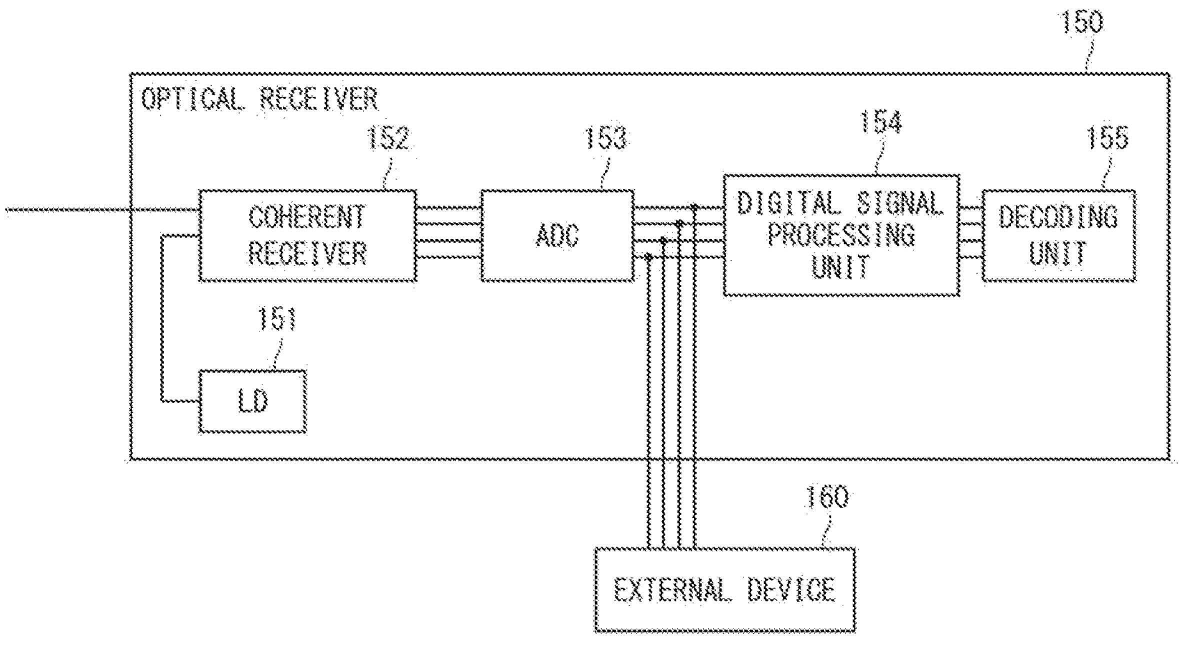
FIG. 13 is a block diagram showing an optical receiver used in a modified example.

FIG. 13 shows an optical receiver used in a modified example. In this modified example, the optical receiver 150 is connected to an external device 160. The external device 160 is constituted, for example, by a computer apparatus, such as a personal computer (PC). In the optical receiver 150, a digital signal that the ADC 153 outputs is branched to the external device 160. The optical receiver 150 includes an interface for connecting to the external device 160 and outputs a digital signal to the external device 160 via this interface.

The external device 160 reproduces an operation of the carrier phase compensation filter 161 and the 4×2 WL equalizer 162 through, for example, simulation and updates the filter coefficients. In the external device 160, the carrier phase compensation filter and the 4×2 WL equalizer may be implemented by dedicated hardware. The external device 160 estimates the Tx load based on the updated filter coefficient of the 4×2 WL equalizer. The external device 160 may transmit the filter coefficient of the pre-equalization unit 112 to the optical transmitter 110 and update the filter coefficient of the pre-equalization unit 112. Alternatively, the filter coefficient corresponding to the Tx load estimated by the external device 160 may be set manually in the pre-equalization unit 112. According to the second example embodiment, when the Tx load is estimated in the external device 160, the digital signal processing unit 154 does not have to include the filter for compensating for the Tx load.

Thus far, some example embodiments of the present disclosure have been described in detail, but the foregoing example embodiments do not limit the present disclosure. An example embodiment obtained by making a change or modification to the foregoing example embodiments within a scope that does not depart from the scope and spirit of the present disclosure is also encompassed by the present disclosure.

Supplementary Note 1

A digital signal processing circuit including:

- a first carrier phase compensation filter configured to compensate for a carrier phase in a polarization-multiplexed optical signal transmitted from a transmitter and received by a receiver;
- a 4×2 widely linear (WL) filter disposed after the first carrier phase compensation filter and configured to compensate for distortion included in the polarization-multiplexed optical signal; and
- a filter coefficient updating unit configured to update a filter coefficient of the first carrier phase compensation filter and a filter coefficient of the 4×2 WL filter by use of an output of the 4×2 WL filter.

Supplementary Note 2

The digital signal processing circuit according to Supplementary Note 1, wherein

- in the polarization-multiplexed optical signal, a signal of a first polarization and a signal of a second polarization are multiplexed, and
- the first carrier phase compensation filter is configured to receive input of the signal of the first polarization and the signal of the second polarization as a complex signal, and to compensate for the carrier phase in each of the first polarization and the second polarization.

Supplementary Note 3

The digital signal processing circuit according to Supplementary Note 2, wherein the 4×2 WL filter is a WL filter configured to receive input of a complex signal of the first polarization, a complex conjugate signal of the first polarization, a complex signal of the second polarization, and a complex conjugate signal of the second polarization, and to output a complex signal of the first polarization and a complex signal of the second polarization.

Supplementary Note 4

The digital signal processing circuit according to any one of Supplementary Notes 1 to 3, further including a second carrier phase compensation filter disposed after the 4×2 WL filter, wherein the filter coefficient updating unit is configured to cause one of the first carrier phase compensation filter and the second carrier phase compensation filter to perform carrier phase compensation, and to prevent the other of the first carrier phase compensation filter and the second carrier phase compensation filter from performing carrier phase compensation.

Supplementary Note 5

The digital signal processing circuit according to Supplementary Note 4, wherein the filter coefficient updating unit is configured to update a filter coefficient of one of the first carrier phase compensation filter and the second carrier phase compensation filter by use of the output of the 4×2 WL filter, and to fix a filter coefficient of one of the first carrier phase compensation filter and the second carrier phase compensation filter at a phase compensation amount of 0.

Supplementary Note 6

The digital signal processing circuit according to any one of Supplementary Notes 1 to 5, further including a distortion estimating unit configured to estimate distortion in the transmitter based on the filter coefficient of the 4×2 WL filter.

Supplementary Note 7

The digital signal processing circuit according to any one of Supplementary Notes 1 to 6, wherein the 4×2 WL filter is configured to compensate for distortion produced in the transmitter and polarization mode dispersion.

Supplementary Note 8

A receiver including:

a detector configured to coherently receive a polarization-multiplexed optical signal transmitted from a transmitter via a transmission line; and a digital signal processing circuit configured to perform equalization signal processing on the reception signal coherently received, wherein the digital signal processing circuit includes a carrier phase compensation filter configured to compensate for a carrier phase in the reception signal, a 4×2 widely linear (WL) filter disposed after the carrier phase compensation filter and configured to compensate for distortion included in the polarization-multiplexed optical signal, and a filter coefficient updating unit configured to update a filter coefficient of the carrier phase compensation filter and a filter coefficient of the 4×2 WL filter by use of an output of the 4×2 WL filter.

Supplementary Note 9

The receiver according to Supplementary Note 8, wherein in the polarization-multiplexed optical signal, a signal of a first polarization and a signal of a second polarization are multiplexed, and the carrier phase compensation filter is configured to receive input of the signal of the first polarization and the signal of the second polarization as a complex signal, and to compensate for the carrier phase in each of the first polarization and the second polarization.

Supplementary Note 10

The receiver according to Supplementary Note 9, wherein the 4×2 WL filter is a WL filter configured to receive input of a complex signal of the first polarization, a complex conjugate signal of the first polarization, a complex signal of the second polarization, and a complex conjugate signal of the second polarization, and to output a complex signal of the first polarization and a complex signal of the second polarization.

Supplementary Note 11

A communication system including:

a transmitter configured to transmit a polarization-multiplexed optical signal via a transmission line; and a receiver configured to receive the transmitted polarization-multiplexed optical signal, wherein the receiver includes a detector configured to coherently receive the polarization-multiplexed optical signal transmitted from the transmitter, and a digital signal processing circuit configured to perform equalization signal processing on the reception signal coherently received, and the digital signal processing circuit includes a carrier phase compensation filter configured to compensate for a carrier phase in the reception signal, a 4×2 widely linear (WL) filter disposed after the carrier phase compensation filter and configured to compensate for distortion included in the polarization-multiplexed optical signal, and a filter coefficient updating unit configured to update a filter coefficient of the carrier phase compensation filter and a filter coefficient of the 4×2 WL filter by use of an output of the 4×2 WL filter.

Supplementary Note 12

The communication system according to Supplementary Note 11, wherein in the polarization-multiplexed optical signal, a signal of a first polarization and a signal of a second polarization are multiplexed, and the carrier phase compensation filter is configured to receive input of the signal of the first polarization and the signal of the second polarization as a complex signal, and to compensate for the carrier phase in each of the first polarization and the second polarization.

Supplementary Note 13

The communication system according to Supplementary Note 12, wherein the 4×2 WL filter is a WL filter configured to receive input of a complex signal of the first polarization, a complex conjugate signal of the first polarization, a complex signal of the second polarization, and a complex conjugate signal of the second polarization, and to output a complex signal of the first polarization and a complex signal of the second polarization.

Supplementary Note 14

The communication system according to any one of Supplementary Notes 11 to 13, wherein the transmitter includes a pre-equalization unit configured to pre-equalize the polarization-multiplexed optical signal, and a filter coefficient of the pre-equalization unit is controlled in accordance with distortion in the transmitter estimated based on the filter coefficient of the 4×2 WL filter.

Supplementary Note 15

A digital signal processing method including:

compensating for, by a carrier phase compensation filter, a carrier phase in a polarization-multiplexed optical signal transmitted from a transmitter and received by a receiver;

compensating for, by a 4×2 widely linear (WL) filter disposed after the carrier phase compensation filter, distortion included in the polarization-multiplexed optical signal; and updating a filter coefficient of the carrier phase compensation filter and a filter coefficient of the 4×2 WL filter by use of an output of the 4×2 WL filter.

REFERENCE SIGNS LIST

10: COMMUNICATION SYSTEM
11: TRANSMITTER
15: RECEIVER
13: TRANSMISSION LINE
21: DETECTOR
22: DIGITAL SIGNAL PROCESSING CIRCUIT
31: CARRIER PHASE COMPENSATION FILTER
32: 4×2 WL FILTER
33: FILTER COEFFICIENT UPDATING UNIT
100: OPTICAL FIBER COMMUNICATION SYSTEM
110: OPTICAL TRANSMITTER
130: TRANSMISSION LINE
150: OPTICAL RECEIVER
111: ENCODING UNIT
112: PRE-EQUALIZATION UNIT
113: DAC
114: OPTICAL MODULATOR
115: LD
117: 2×1 WL FILTER
118: IQ SEPARATING UNIT
132: OPTICAL FIBER
133: OPTICAL AMPLIFIER
151: LD
152: COHERENT RECEIVER
153: ADC
154: DIGITAL SIGNAL PROCESSING UNIT
155: DECODING UNIT
161, 163: CARRIER PHASE COMPENSATION FILTER
162: 4×2 WL EQUALIZER
165: DISTORTION ESTIMATING UNIT
170: FILTER COEFFICIENT UPDATING UNIT
181: COMPLEX CONJUGATE CONVERTING UNIT
182: COMPLEX COEFFICIENT FILTER
190: 2×1 WL EQUALIZER
191: COMPLEX CONJUGATE CONVERTING UNIT
192: COMPLEX COEFFICIENT FILTER

What is claimed is:

1. A digital signal processing circuit comprising:

a first carrier phase compensation filter configured to compensate for a carrier phase in a polarization-multiplexed optical signal transmitted from a transmitter and received by a receiver;

a 4×2 widely linear (WL) filter disposed after the first carrier phase compensation filter and configured to compensate for distortion included in the polarization-multiplexed optical signal; and at least one memory storing instructions; and at least one processor configured to execute the instructions to:

update a filter coefficient of the first carrier phase compensation filter and a filter coefficient of the 4×2 WL filter by use of an output of the 4×2 WL filter.

2. The digital signal processing circuit according to claim 1, wherein in the polarization-multiplexed optical signal, a signal of a first polarization and a signal of a second polarization are multiplexed, and the first carrier phase compensation filter is configured to receive input of the signal of the first polarization and the signal of the second polarization as a complex signal, and to compensate for the carrier phase in each of the first polarization and the second polarization.

3. The digital signal processing circuit according to claim 2, wherein the 4×2 WL filter is a WL filter configured to receive input of a complex signal of the first polarization, a complex conjugate signal of the first polarization, a complex signal of the second polarization, and a complex conjugate signal of the second polarization, and to output a complex signal of the first polarization and a complex signal of the second polarization.

4. The digital signal processing circuit according to claim 1, further comprising a second carrier phase compensation filter disposed after the 4×2 WL filter, wherein the at least one processor is configured to execute the instructions to cause one of the first carrier phase compensation filter and the second carrier phase compensation filter to perform carrier phase compensation, and to prevent the other of the first carrier phase compensation filter and the second carrier phase compensation filter from performing carrier phase compensation.

5. The digital signal processing circuit according to claim 4, wherein the at least one processor is configured to execute the instructions to update a filter coefficient of one of the first carrier phase compensation filter and the second carrier phase compensation filter by use of the output of the 4×2 WL filter, and to fix a filter coefficient of one of the first carrier phase compensation filter and the second carrier phase compensation filter at a phase compensation amount of 0.

6. The digital signal processing circuit according to claim 1, wherein the at least one processor is further configured to execute the instructions to estimate distortion in the transmitter based on the filter coefficient of the 4×2 WL filter.

7. The digital signal processing circuit according to claim 1, wherein the 4×2 WL filter is configured to compensate for distortion produced in the transmitter and polarization mode dispersion.

8. A receiver comprising:

a detector configured to coherently receive a polarization-multiplexed optical signal transmitted from a transmitter via a transmission line; and the digital signal processing circuit according to claim 1.

9. The receiver according to claim 8, wherein in the polarization-multiplexed optical signal, a signal of a first polarization and a signal of a second polarization are multiplexed, and the carrier phase compensation filter is configured to receive input of the signal of the first polarization and the signal of the second polarization as a complex signal, and to compensate for the carrier phase in each of the first polarization and the second polarization.

10. The receiver according to claim 9, wherein the 4×2 WL filter is a WL filter configured to receive input of a complex signal of the first polarization, a complex conjugate signal of the first polarization, a complex signal of the second polarization, and a complex conjugate signal of the second polarization, and to output a complex signal of the first polarization and a complex signal of the second polarization.

11. A communication system comprising:

a transmitter configured to transmit a polarization-multiplexed optical signal via a transmission line; and the receiver according to claim 8.

12. The communication system according to claim 11, wherein in the polarization-multiplexed optical signal, a signal of a first polarization and a signal of a second polarization are multiplexed, and the carrier phase compensation filter is configured to receive input of the signal of the first polarization and the signal of the second polarization as a complex signal, and to compensate for the carrier phase in each of the first polarization and the second polarization.

13. The communication system according to claim 12, wherein the 4×2 WL filter is a WL filter configured to receive input of a complex signal of the first polarization, a complex conjugate signal of the first polarization, a complex signal of the second polarization, and a complex conjugate signal of the second polarization, and to output a complex signal of the first polarization and a complex signal of the second polarization.

14. The communication system according to claim 11, wherein the transmitter includes a pre-equalizer configured to pre-equalize the polarization-multiplexed optical signal, and a filter coefficient of the pre-equalizer is controlled in accordance with distortion in the transmitter estimated based on the filter coefficient of the 4×2 WL filter.

15. A digital signal processing method comprising:

compensating for, by a carrier phase compensation filter, a carrier phase in a polarization-multiplexed optical signal transmitted from a transmitter and received by a receiver;

compensating for, by a 4×2 widely linear (WL) filter disposed after the carrier phase compensation filter, distortion included in the polarization-multiplexed optical signal; and updating a filter coefficient of the carrier phase compensation filter and a filter coefficient of the 4×2 WL filter by use of an output of the 4×2 WL filter.

* * * * *